Nov. 16, 1937.  C. L. HOWSE ET AL  2,099,667

GAS TREATING APPARATUS

Filed May 24, 1934  3 Sheets-Sheet 1

INVENTORS
Curtis L. Howse
Willis P. Thomas
Frank Bowers.
BY
ATTORNEYS

Nov. 16, 1937.  C. L. HOWSE ET AL  2,099,667
GAS TREATING APPARATUS
Filed May 24, 1934  3 Sheets-Sheet 2

INVENTORS
Curtis L. Howse
Willis P. Thomas
Frank Bowers
BY
ATTORNEYS

Patented Nov. 16, 1937

2,099,667

UNITED STATES PATENT OFFICE 2,099,667

GAS TREATING APPARATUS

Curtis L. Howse, Willis P. Thomas, and Frank Bowers, Detroit, Mich., assignors to Diamond Power Specialty Corporation, Detroit, Mich., a corporation of Michigan Application May 24, 1934, Serial No. 727,328

18 Claims. (Cl. 261—90)

This invention relates to an apparatus for treating the gases which are discharged from a furnace or the like and has particular reference to a construction for removing dust and other objectionable elements from these gases and for removing to a large extent the heat of these gases.

One of the primary objects of this invention is to provide means for subjecting the gases to be treated to contact with a film of a dust-collecting fluid.

A further object of this invention is to provide a construction in which the surfaces which carry the dust-collecting fluid will be periodically cleaned or flushed so that the dust-laden film of dust-collecting fluid will be removed and a clean film of fluid substituted therefor.

The invention further contemplates in one embodiment the provision of means whereby a fluid to be heated may be flowed in heat exchange relation to the gases being treated and the provision in certain embodiments of means for utilizing centrifugal force or the like to present a film of a dust-collecting liquid to the gases to be treated.

Numerous other objects and advantages of this invention will become more apparent as the following description proceeds, particularly when reference is had to the accompanying drawings, wherein.

Figure 1:
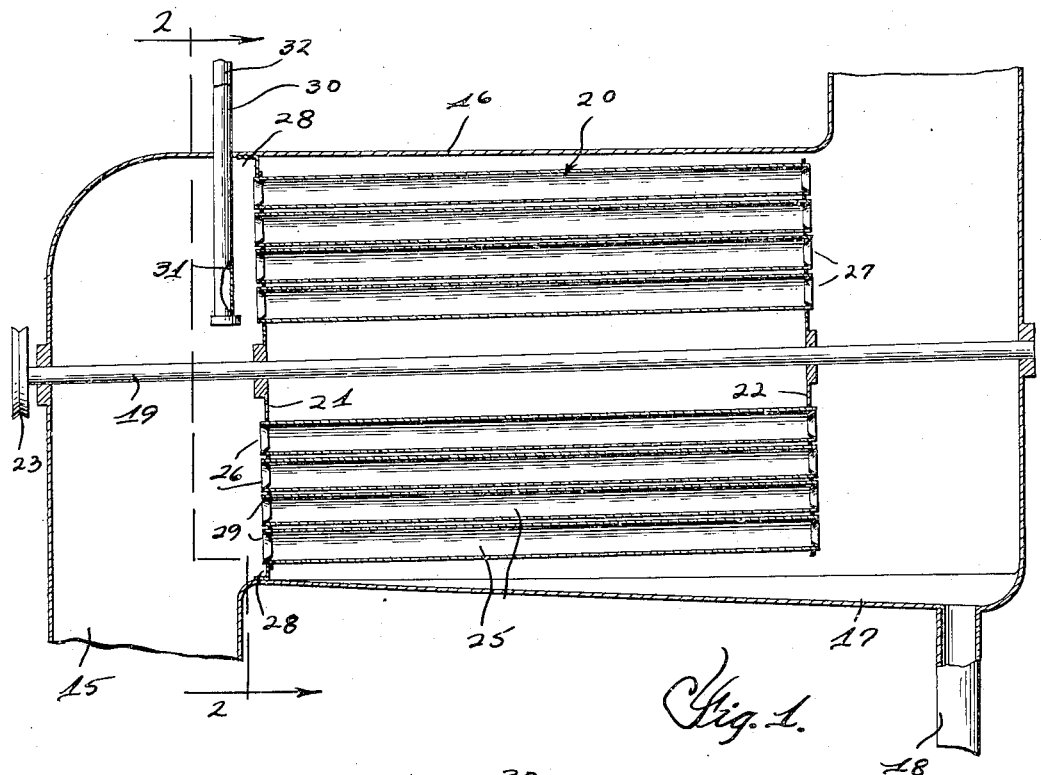
Fig. 1 is a semi-diagrammatic sectional view through one embodiment of an apparatus constructed in accordance with the teachings of this invention.

In its broader aspects, the invention contemplates the provision of a plurality of dust-collecting elements which are preferably elongated, together with means for moving these elements or members through the path of gas flow. For the sake of convenience these members may be called rundles in that they may be tubular members or elongated solid members. In each embodiment of the invention provision is made to coat one or more surfaces of each rundle with a dust-collecting fluid and provision is also made to periodically clean or flush the coated surfaces of these rundles.

If the rundles are tubular, the inside surfaces only of these rundles may be coated with the dust-collecting fluid or liquid or, if desired, both the inside and outside surfaces of these rundles may be coated with the dust-collecting fluid. Obviously if the rundles are solid, only the outside surfaces thereof are coated. The outer surfaces of the rundles, however, may be smooth, roughened in any desired manner, or coated with a suitable heat resistance material, as desired.

Where the rundles are tubular, the invention in its broader aspects provides for supplying a dust-collecting fluid to the interior of these members and for so moving the members that the fluid is caused to cover the inner surfaces of the same. The gas to be treated is caused to flow through the hollow or tubular rundles and is thus caused to contact with the dust-collecting fluid which covers the inner surfaces thereof. In those instances where the gas to be treated flows only through the rundles, provision is preferably made to flow a fluid to be heated over the outer surfaces of the rundles with the result that the heat absorbed from the gases by the rundles will be transmitted to the fluid to be heated.

In the drawings, wherein several embodiments of the inventive idea are disclosed and wherein like reference characters designate corresponding parts throughout all views, the numeral 15 designates a gas passage adapted to receive gases from any suitable source such as a furnace or the like and adapted to either discharge these gases into the atmosphere or to conduct the same to a point of use. The invention provides an apparatus for removing from these gases prior to their discharge from the passage, the dust and other objectionable elements and provides means for also salvaging to a large extent the heat of these gases.

By reference to Fig. 1 of the drawings, it will be noted that the gas passage is provided intermediate its ends with a substantially horizontal portion 16 and is provided adjacent the outlet end of this substantially horizontal portion with a sump or the like 17 which communicates with a drain pipe 18.

Rotatably supported in the portion 16 of the gas passage, as by a shaft 19, is a drum designated generally by the reference character 20. This drum comprises the spaced headers 21 and 22 which are fixed to the shaft 19 for rotation with the same. As illustrated, the shaft may be extended to a point outside of the gas passage and may be provided with a pulley or the like 23 by which the shaft may be rotated from any suitable source of power (not shown).

Fixed in the headers 21 and 22 are a plurality of rundles which in this embodiment are hollow members such as the tubes 25. These tubes extend longitudinally of the drum and have their inlet ends 26 so arranged that the gases flowing through the passage 15 must enter the tubes. It will be obvious that the gas passes through the tubes and is discharged from the outlet ends 27 thereof to flow onwardly through the gas passage 15 to a point of use or discharge. It will be noted that the gas passage is provided adjacent the forward end of the horizontal portion 16 with an inner baffle member 28 which snugly engages the periphery of the drum to prevent the gases from flowing around the drum and to thus compel the gases to pass through the tubes as above described.

The invention contemplates the provision of means for supplying a dust-collecting fluid to the tubes 25 and the provision of means for maintaining a certain level of this fluid in each tube. Accordingly, each tube is provided adjacent each end with a baffle member or the like 29 which constitutes a dam, the arrangement being such that when a fluid is discharged into the tube a certain quantity of this fluid will be retained in the tube by the dams. Projecting into the gas passage adjacent the forward end of the drum is a pipe 30 provided with a plurality of discharge orifices 31 so arranged as to register with the open ends of the tubes 25 as these tubes are brought into alignment with the pipe upon rotation of the drum. The pipe 30 is connected to any suitable source of dust-collecting fluid supply, such as water or the like.

The invention further contemplates the provision of means for periodically flushing each tube 25 after the tube has made one complete revolution about the axis 19 of the drum. Accordingly a second pipe 32 is provided, this pipe being adjacent the pipe 30 and being connected to any suitable source of flushing fluid such as water. The arrangement is such that as the drum is rotated in the direction of the arrow in Fig. 2, each tube is first brought into registration with one of the nozzles 33 in the pipe 32 whereby the flushing fluid is flowed through the tube, and each tube is then brought into registration with one of the nozzles in the pipe 30 by which the tube is supplied with the dust-collecting fluid.

It is contemplated that the tubes 25 will be slightly inclined to the horizontal, and for this purpose the entire drum is arranged at an inclination, as clearly illustrated in Fig. 1 of the drawings. The inclination of the drum and tubes is such as to prevent the gases in the passage 15 from flowing directly through the tubes, and the inclination of the tubes is therefore determined by the gas velocity, the greater the velocity the greater the inclination which is given to the tubes, as will be readily understood. Further, with the tubes inclined in the manner illustrated, while gravity tends to keep the dust collecting fluid, such as water, adjacent the inlet ends of the tubes, the velocity of the gas flow tends to force the dust-collecting fluid to adjacent the outlet ends of the tubes, with the result that the dust collecting fluid is distributed throughout the length of the tubes.

Figure 2:
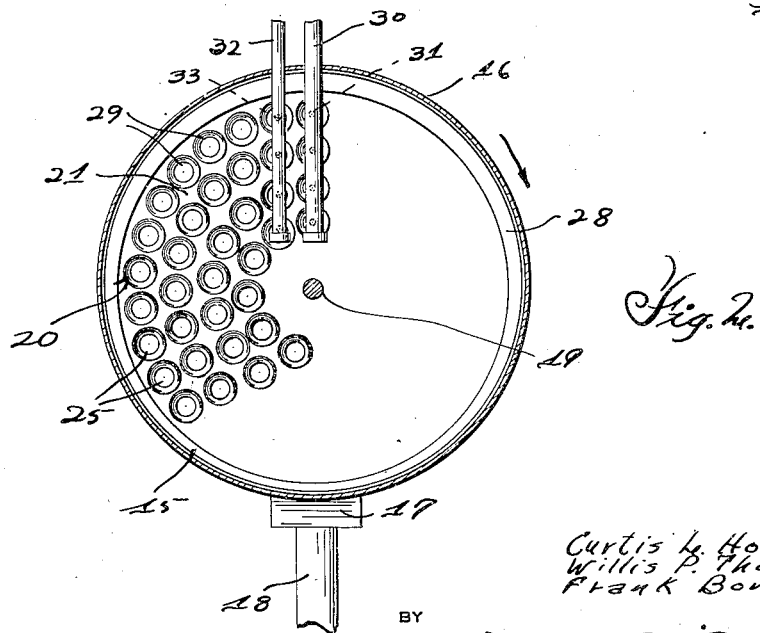
Fig. 2 is a sectional view taken substantially on the line 2—2 of Fig. 1.

In operation and when water is used as the dust-collecting and flushing fluid, the drum is rotated in the direction of the arrow in Fig. 2 of the drawings, by properly rotating shaft 19. As each tube is brought opposite one of the nozzles in pipe 32, the tube is flushed by the water discharged from this pipe, the flushing water carrying with it the dust and the like collected on the inner periphery of the tube and being discharged through the outlet end 27 of the tube where it may flow out of the gas passage by way of the drain 18. After being flushed by water from the pipe 32, each tube is then brought into registration with one of the nozzles in pipe 30 whereby each tube is supplied with a quantity of water. The dams in the tubes retain the water in the tubes, and the rotation of the drum causes the water to be rotated in the tubes and to cover the inner peripheries of the tubes, as will be readily apparent. The gases flowing through the tubes will contact with the water covering the inner peripheries thereof so that this water will collect the dust and other objectional elements from the gases. When each tube has made a substantially complete revolution about the axis of the drum, it is flushed by water from the pipe 32, the dust laden liquid in the tube being flushed out as before described.

In order that the water will rotate in the tubes as above described, $$\frac{Mv^2}{r}$$

must be less than W, where M represents the mass of the gas, $v$ is the velocity of rotation, $r$ is the radius of the drum, and W is the weight of the water. Stated another way, the velocity of rotation must be less than $$\sqrt{gr},$$

where $g$ of course is the gravity constant and $r$ is the radius of the drum. If the drum is properly rotated, the liquid within the tubes covers the inner peripheries thereof to present a dust-collecting surface to the gases flowing through the tubes, as above brought out.

Figure 3:
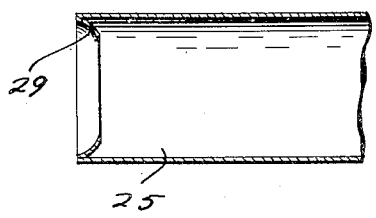
Fig. 3 is an enlarged fragmentary sectional view of one of the elements forming a part of the construction shown in Fig. 1.
Figure 4:
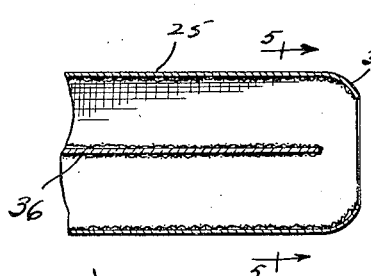
Fig. 4 is a view similar to Fig. 3 showing a slightly modified form of element.
Figure 5:
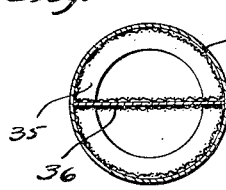
Fig. 5 is a sectional view taken substantially on the line 5—5 of Fig. 4.

In place of the dam 29 shown in Fig. 3 of the drawings, other means may be utilized for retaining a predetermined level of liquid in each tube. Thus, as illustrated in Figs. 4 and 5 of the drawings, each tube may be provided on each end with an inwardly curved flange portion 35 which partially closes the end of the tube to constitute a dam therefor. Further, if desired, the surface within the tube may be appreciably increased by arranging a partition 36 within the tube, and this partition together with the inner periphery of the tube may or may not be roughened or lined with wire mesh as desired. It is to be understood that the partition shown may be utilized either with the flanged tube shown in Fig. 4 of the drawings or with the form of tube shown in Fig. 3 of the drawings since the partition constitutes an addition to the tube rather than a complete alternate form of tube.

Figure 6:
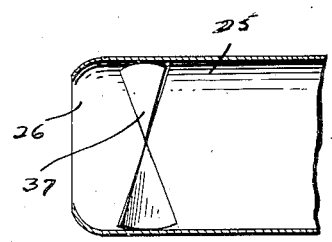
Fig. 6 is a view similar to Fig. 3 showing a further modified form of element.

A further modification of tube construction is shown in Fig. 6 of the drawings wherein a curved blade 37 is illustrated as being positioned adjacent the inlet end of the tube. This blade tends to impart a spiral movement to the gases flowing through the tube, with the result that these gases are caused to more intimately contact with the inner periphery of the tube and the liquid retained thereon.

Figure 7:
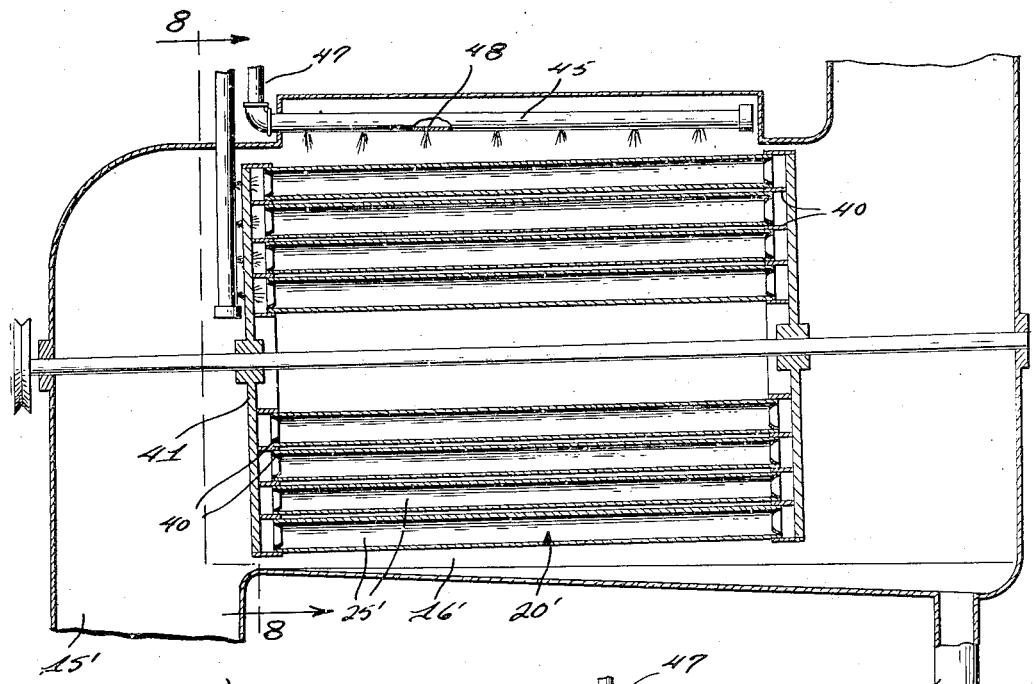
Fig. 7 is a view similar to Fig. 1 showing a slightly modified form of apparatus.
Figure 8:
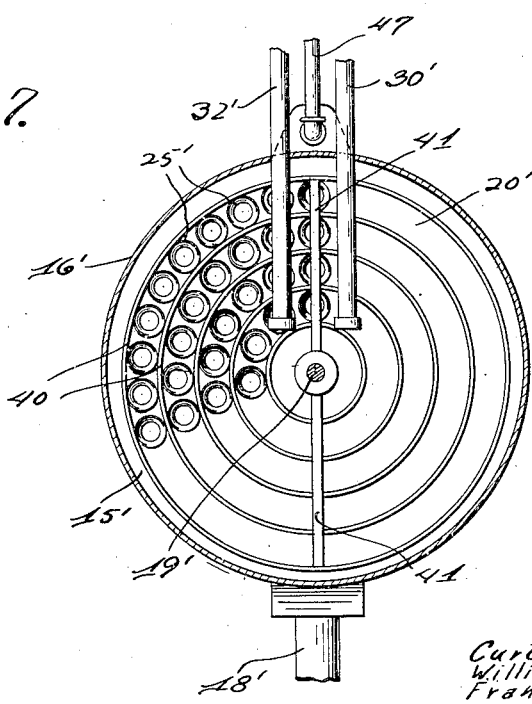
Fig. 8 is a sectional view taken substantially on the line 8—8 of Fig. 7.

In Figs. 7 and 8 a further modification of the inventive idea is disclosed, and by reference to these figures of the drawings it will be noted that the gas passage 15' is provided as before with a substantially horizontal portion 16'. Located in this substantially horizontal portion of the gas passage and, inclined to the horizontal as above described, is a drum designated generally by the reference character 20'. In this case, however, the drum comprises a series of annular supporting rings 40 which are supported by arms or the like 41 which extend radially from the shaft 19'. The tubular rundles 25' are supported at their ends in the rings 40, with the result that the gases flowing through the passage 15' may flow not only through the tubes 25', but also around the same. As previously described, pipes 30' and 32' are provided for discharging dust-collecting and flushing fluids into the open ends of the tubes, these tubes being provided with suitable dams for retaining a predetermined level of the dust-collecting fluid therein.

To remove the dust or the like from the gas which flows around the exteriors of the tubes 25', a pipe 45 is provided. This pipe extends longitudinally of the drum and is supported above the same in a suitable housing 46 located along the upper edge of the horizontal portion of the gas passage. The pipe 45 is connected by pipe 47 to any suitable source of dust collecting fluid supply such as water, and is provided with the downwardly opening outlets 48 by which fluid from the pipe may be sprayed over the exteriors of the tubes 25'. It will thus be obvious that the dust will be removed from the gases flowing through the tubes in the manner previously described, while the dust will be removed from the gases flowing around the exteriors of the tubes by the fluid which is sprayed downwardly over the tubes from the pipe 45. As in the first described form of construction, the dust laden liquid may be conducted away from the gas passage by a suitable drain connection 18'.

Figure 9:
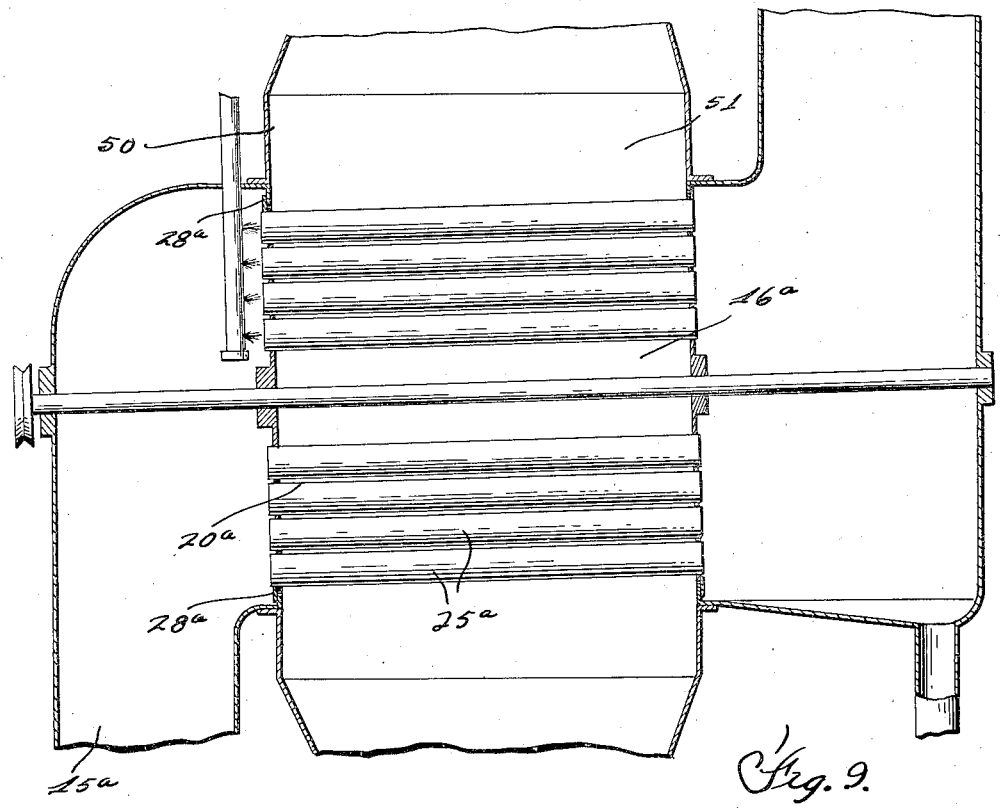
Fig. 9 is a view similar to Fig. 1 showing a still further modification of the inventive idea.

In Fig. 9 a further modification of the inventive idea is disclosed in which means is provided for obtaining the heat from the gases flowing through the passage 15ᵃ. By reference to this figure of the drawings it will be noted that there is mounted in the horizontal portion 16ᵃ of the gas passage 15ᵃ a drum 20ᵃ. This drum is provided with the tubes 25ᵃ through which the gases are compelled to flow by means of the baffles 28ᵃ, which are arranged within the gas passage adjacent the forward end of the drum.

In this form of construction, however, a casing 50 provides a passage 51 which extends transversely of the gas passage 15ᵃ. The arrangement is such that the tubes 25ᵃ project through the passage 51, with the result that air flowing through the passage 51 may be heated by contact with the tubes 25ᵃ, these tubes being heated in turn by the hot gases flowing through the same from the passage 15ᵃ.

From the above it will be apparent that the invention provides an apparatus for efficiently removing from a gas, dust particles and the like suspended therein. The invention further provides means for periodically flushing or cleaning the dust collecting surfaces, with the result that the apparatus will always be operating at the utmost efficiency. The invention further provides means for associating with the dust-collecting structure a means for flowing a fluid to be heated such as air in heat exchange relation to the hot gases from which the dust is being removed, with the result that the gases are not only cleaned but are also cooled during operation of the apparatus.

While the invention has been described with some detail, it is to be understood that the several embodiments disclosed are for the purposes of illustration only and that the right is reserved to make all such changes in the details of construction and arrangement of parts as will fall within the purview of the attached claims.

What we claim as our invention is:

1. In combination, a gas passage, means for moving a plurality of rundles through said passage so that the gas flowing through said passage must contact portions of the surfaces of said rundles, fluid spraying means for coating the surfaces of said rundles which are contacted by the gas with a dust-collecting fluid and additional fluid spraying means for flushing the coated surfaces of said rundles to clean the same.

2. In combination, a gas passage having a substantially horizontal portion, a plurality of rundles, means for moving said rundles through the horizontal portion of said gas passage in such a manner that the gas passing through the horizontal portion of said gas passage must contact portions of the surfaces of said rundles, fluid discharge means for coating the surfaces of said rundles which are contacted by the gas with a dust-collecting fluid, and fluid discharge means for periodically flushing the coated surfaces of said rundles.

3. In combination, a gas passage having a substantially horizontal portion, a drum rotatably mounted in the horizontal portion of said gas passage, means for rotating said drum, a plurality of rundles carried by said drum and rotatable therewith, the arrangement of said rundles being such that the gas passing through the horizontal portion of said gas passage must contact portions of the surfaces of said rundles, fluid discharge means for coating the surfaces of said rundles which are contacted by the gas with a dust-collecting fluid, and fluid discharge means for periodically flushing the coated surfaces of said rundles.

4. In combination, a tubular member, means for flowing a gas through said tubular member, means for supplying a dust-collecting liquid to said tubular member, means for maintaining a predetermined level of the dust-collecting liquid in said tubular member, and means for moving said tubular member about an axis spaced from the axis of the tubular member to cause the dust collecting liquid to rotate therein.

5. In a device of the character described, a casing, a tubular member rotatively mounted in said casing, means to rotate the tubular member, means for flowing a gas through said tubular member, liquid discharge means for periodically supplying a dust-collecting liquid to the interior of said tubular member, and additional liquid discharge means for periodically flushing the interior of said tubular member.

6. In combination, a tubular member, means for flowing a gas through said tubular member, means for supplying a dust-collecting liquid to said tubular member, means for retaining a predetermined level of the dust-collecting liquid in said tubular member, means for revolving the tubular member to cause the dust collecting liquid to cover the inner periphery of the tubular member, and means for periodically flushing the tubular member to remove the dust laden liquid therefrom.

7. In combination, a gas passage, a drum rotatably mounted in said gas passage, means for rotating said drum, tubular members carried by said drum through which the gas in said passage may pass, a pipe projecting into said passage for discharging a dust collecting liquid into said tubular members, and a second pipe projecting into said passage for discharging a flushing liquid into the interiors of the tubular members to clean the same.

8. In combination, a tubular member, means for flowing a gas through said tubular member, means for supplying a dust-collecting liquid to the interior of said tubular member, means for revolving the tubular member about an axis spaced from the axis of the tubular member and baffles arranged at the ends of said tubular member and constituting dams for retaining a predetermined level of the dust-collecting liquid in said tubular member.

9. In combination, a passage for dust laden gases, a rotatable tube open at its ends but having imperforate side walls supported in said passage and so arranged that the gas flowing through said passage may pass unidirectionally through and around said tube, means for supplying a dust-collecting liquid to the interior of said tube to wet the interior surface thereof, and means for discharging a dust-collecting liquid over the exterior of the tube to wet the exterior surface thereof.

10. In combination, a gas passage, a drum rotatably mounted in said gas passage, a plurality of tubes supported by said drum and so arranged that the gas flowing through said passage may pass through said tubes and also around the same, means for periodically supplying a dust-collecting liquid to the interior of each tube, means associated with each tube for retaining a predetermined level of the dust-collecting liquid in the same, means for periodically flushing the interior of each tube, and means for discharging a dust-collecting liquid over the interiors of said tubes to collect the dust from the gas flowing around the outsides of said tubes.

11. In combination, a tubular member, means for flowing a hot dust laden gas through said tubular member, means for supplying a dust-collecting liquid to the interior of said tubular member to collect the dust from the gas flowing through the same, and means for flowing a fluid to be heated over the exterior of said tube.

12. In combination, a gas passage, a drum rotatably mounted in said gas passage, a plurality of tubes carried by said drum and so arranged that all of the gas passing through said passage must flow through said tubes, means for supplying a dust-collecting liquid to the interiors of said tubes, means for rotating the drum to cause the dust-collecting liquid in the tubes to cover the inner peripheries thereof, and means for flowing a fluid to be heated over the exteriors of said tubes in heat exchange relation therewith.

13. In combination, a gas passage, a drum rotatably mounted in said gas passage, tubular members carried by said drum and inclined to the direction of gas flow, said tubular members being so arranged that the gas flowing through said passage flows through said tubular members, means for periodically supplying a dust-collecting liquid to the interiors of said tubular members, and means for retaining a predetermined level of the dust-collecting liquid in each tubular member.

14. In combination, a gas passage, a drum rotatably mounted in said gas passage, tubular members carried by said drum and inclined to the direction of gas flow, said tubular members being so arranged that the gas in said passage flows through said tubular members, means for supplying a dust-collecting liquid to the interiors of said tubular members, and means for periodically flushing the interiors of said tubular members.

15. In a device of the character described, a tubular member, means for flowing a gas through said tubular member, means for moving said tubular member along a definite path, means arranged to discharge a flushing liquid into the interior of the tubular member at one point in the path of movement of the tubular member, and additional means arranged to supply a dust collecting liquid to the interior of the tubular member at a further point in its path of movement.

16. In combination a tubular member mounted in a rotatable drum, means for flowing a gas through said tubular member, means for supplying dust-collecting liquid to said tubular member, and means operating to revolve said tubular member at a definite speed dependent upon the mass of gas, the weight of the dust collecting liquid and the radius of the drum so that the liquid will be distributed in the form of a film on the inner periphery of the tubular member.

17. In combination, a gas passage having a substantially horizontal portion, a drum rotatably mounted in the horizontal portion of said gas passage, tubular members carried by said drum and inclined to the horizontal, the tubular members being so arranged that the gas enters the lower ends thereof, and means for supplying a dust collecting liquid to the tubular members, the inclination of the tubular members being such that gravity substantially counteracts the tendency of the gas flow to force the dust collecting liquid out of the tubular members.

18. In a device of the character described, a gas passage, a drum rotatably mounted in the gas passage, tubular members carried by the drum and so arranged that the gas flowing through said passage passes through the tubular members, means for supplying a dust collecting liquid to the interiors of said tubular members, and means for flowing a fluid over the exterior surfaces of said tubular members in heat exchange relation with respect to the same.

CURTIS L. HOWSE.
WILLIS P. THOMAS.
FRANK BOWERS.